3,574,855
SYNERGISTIC WOOD PRESERVATIVE COMPOSITIONS
Frederick Leroy Brown, Midland, Mich., assignor to The Dow Chemical Company, Midland, Mich.
No Drawing. Filed Sept. 2, 1966, Ser. No. 576,861
Int. Cl. A01n *9/22, 9/26*
U.S. Cl. 424—263          3 Claims

---

ABSTRACT OF THE DISCLOSURE

Synergistic mixtures of 96 to 25 weight parts of (A) pentachlorophenol or an alkali metal salt thereof and 4 to 75 weight parts of (B) 2,3,5-trichloro-4-(methylsulfonyl)pyridine or 2,3,5,6-tetrachloro-4-(methylsulfonyl)pyridine. The mixtures are useful in protecting wood against decay, degradation and staining caused by microorganisms, and give better protection than either of the components when employed alone.

---

The present invention is directed to new compositions which have improved properties as wood preservatives. In particular, the present invention is directed to synergistic mixtures of (A) pentachlorophenol or an alkali metal salt thereof and (B) 2,3,5,6-tetrachloro-4-(methylsulfonyl)pyridine or 2,3,5-trichloro-4-(methylsulfonyl)pyridine wherein the mixture is comprised of from 96 to 25 parts by weight of (A) 4 to 75 parts by weight of (B). These mixtures when employed in conventional wood preservation techniques give better protection against decay, degradation and staining caused by microorganisms than either of the components when employed alone.

The synergistic mixtures of the present invention can be employed in wood preservative compositions wherein the synergistic mixtures are employed with any convenient carrier system. In such compositions, the carrier serves as an adjuvant and helper and enhances the effectiveness of the synergistic mixture by increasing the depth to which the synergistic mixture penetrates, the amount of synergistic composition absorbed, and the like. Representative carriers include water, alcohols, glycols, benzene, kerosene and other petroleum distillates or convenient combinations of any of these or other suitable carrier systems. In such wood preservative compositions, the synergistic mixture will generally be employed at a concentration of from about 1 to about 10 percent by weight of the total composition. However, higher concentrations can be employed when conditions so require. Concentrate compositions containing the synergistic mixture at concentrations of from 10 to 95 percent are often employed in order to avoid shipping large quantities of liquid. Such concentrates are usually, although not always, diluted with additional carrier to prepare the composition to be employed in treatment.

The synergistic mixtures of the present invention can be employed in compositions containing penetrating carrier vehicles and/or water-resistant binding vehicles and/or one or more of the known wood preservative agents such as borax, creosote, by-product oils, and the like. Certain of the wood preservatives to be employed, notably the by-product oils, serve as adjuvant, as penetrative carrier vehicle and/or binding material and because of the combination of properties, their use is preferred.

In addition, the synergistic mixture of the present invention can be employed in conjunction with chemical substances which act as ultraviolet absorbers or films which mask the components of the synergistic mixture from ultraviolet radiation, such as paint films or other protective coatings. When the synergistic mixture of the present invention is to be employed in uses where the ultimate product will be exposed to light the use of an ultraviolet absorber is preferred. In order to provide protection for the synergistic mixture against leaching or ultraviolet light or other atmospheric and/or environmental deterioration, it is often desirable to employ the synergistic mixture as a component in various protective coatings such as paints. These can be paints that, after application, become a firm and hard substance, such as paints based upon alkyd resins, or upon such drying oils as linseed, tung-nut, and like oils. The synergistic mixture functions effectively in the presence or absence of, for example, metal flakes, pigments, volatile oils and the like.

In such applications to wood, the synergistic mixtures or compositions containing them can be applied by brushing, dipping, spraying, immersing, or the like according to known procedures. However, when it is desired to obtain more long lasting control of fungal organisms, it is preferred to make application under pressure, frequently described as "pressure treatment," of a composition containing the synergistic mixture and a penetrating carrier vehicle. In compositions utilized in the pressure treatment procedures, the synergistic mixtures of the present invention can be conveniently employed at concentrations of from about 1 to about 10 percent by weight. Representative carrier vehicles include petroleum oil, creosote-petroleum solutions, or various organic solvents, such as benzene, toluene, dioxane, acetone, liquified petroleum gas, and the like.

In general, when employing the "pressure treatment" the synergistic mixtures of the present invention and the material to be impregnated are placed under vacuum, such as from about 5 to about 600 millimeters of mercury. Thereafter, a composition comprising the synergistic mixture and a penetrating carrier vehicle is introduced into the vessel so as to effect the immersion of the wood therein. The contents of the vessel can thereafter be placed successively under superatmospheric pressure, such as about 250 p.s.i., in some instances more, and under subatmospheric pressure, as previously set forth, for periods of time to facilitate the movement of the synergistic mixture into the wood. Techniques for facilitating penetration of the solution into the wood, such as incision, debarking, or other preparation of the wood, can be utilized.

While the free pentachlorophenol compound is of very low solubility in water, and usually presents no serious problem of leaching, the 2,3,5 - trichloro - 4 - (methyl-sulfonyl)pyridine and 2,3,5,6 - tetrachloro - 4 - (methylsulfonyl)pyridine and salts of pentachlorophenol such as sodium pentachlorophenate may be subject to leaching. The occurrence of leaching will depend upon such factors as moisture, sunlight, temperature, the amount of treated surface exposed to the environmental factors, type of wood employed, the type of carrier system employed and the type of treatment. The wood preservative composition containing the synergistic mixtures can contain various water-resistant binding materials, which, when the composition has been applied to the wood, will tend to bind the present toxicant compounds to the wood and to prevent leaching of 2,3,5-trichloro-4-(methylsulfonyl)pyridine, sodium pentachlorophenate and 2,3,4,5 - tetrachloro-4-(methylsulfonyl)pyridine by the action of rain or immersion. Suitable water-resistant binding materials are those materials which are gummy, near-solid or solid at room temperature and which are essentially insoluble in water and soluble in at least one organic solvent and include common paraffin waxes or rosins which can be dissolved in hydrocarbon solvents. Various other binding materials include the drying oils, numerous solvent-soluble resinous thermo-plastic substances, and the like.

The amount of the synergistic mixtures to be employed is not critical as long as an effective amount is retained by the wood being treated. The actual amount of the synergistic mixture retained by the wood will depend upon a number of variables such as type of wood, surface area, moisture content of the wood, density, method of treatment, etc.

The following examples are merely illustrative and are not to be construed as limiting.

EXAMPLE 1

Synergistic mixtures containing pentachlorophenol and 2,3,5,6-tetrachloro-4-(methylsulfonyl)pyridine in proportions of 76 to 24 and 48 to 52 parts by weight of pentachlorophenol to 2,3,5,6-tetrachloro-4-(methylsulfonyl) pyridine, respectively, were prepared. These mixtures were then combined with Western Chemical Company's SC 100 (an aromatic solvent derived from petroleum) in various amounts to prepare the treating compositions. The treating compositions thus prepared were employed in a standard, comparative, wood preservative test (Brown, F. L., A Tensile Strength Test for Comparative Evaluation of Wood Preservatives, Forest Products Journal, September 1963, 405–412). Tensile specimens of Pondorosa Pine Sapwood, 1 inch wide, 6 inches long and 1/16 inch thick and necked down to 3/8 inch at the midpoint were vacuum treated with each of the treating compositions. Following the treatment, the specimens were allowed to dry to permit all of the carrier to evaporate, surface sterilized with steam at atmospheric pressure and aseptically placed in contact with a pure culture of *Lenzites trabea* Pers. ex Fries, a brown-rot organism used in standard preservative tests. Thereafter, the specimens were placed in decay chambers for 10 days. Following the incubation period the specimens were conditioned to a constant weight in a constant temperature humidity room and broken in tension parallel to the grain of the specimens on a Universal test machine.

TABLE I

| Composition being tested | Concentration of total toxicant in treating solution, percent | Retention of test composition by the wood sample, lb./ft.$^3$ | Tensile strength (mean of 3 specimens), p.s.i. |
| --- | --- | --- | --- |
| Pentachlorophenol (A) | 0.060 | 0.20 | 6.83×10$^3$ |
| 2,3,5,6-tetrachloro-4-(methylsulfonyl) pyridine (B) | 0.060 | .020 | 9.9×10$^3$ |
| A/B ratio by weight 48/52 | 0.00527 | .0018 | 11.2×10$^3$ |
|  | 0.0105 | .0038 | 12×10$^3$ |
|  | 0.0158 | .0053 | 11.6×10$^3$ |
|  | 0.0211 | .0073 | 11.8×10$^3$ |
| A/B ratio by weight 76/24 | 0.00949 | .0031 | 12×10$^3$ |
|  | 0.0284 | .0094 | 11.5×10$^3$ |

NOTE.—Mean tensile of 30 unincubated controls was 11.8×10$^3$ p.s.i. with a standard error of 0.32×10$^3$ p.s.i. providing 95 percent confidence limits of 11.2×10$^3$ to 12.4×10$^3$ p.s.i. For incubated but untreated controls the mean tensile was 3.87×10$^3$ p.s.i. with a standard error of 0.48×10$^3$ p.s.i. with confidence limits of 2.86×10$^3$ to 4.88×10$^3$ p.s.i.

EXAMPLE 2

In another representative operation, a set of wood specimens were prepared in exactly the same manner and treated as set forth in Example 1. Treating compositions, prepared in the same manner as set forth in Example 1 were also prepared. Following the treatment of the wood specimens and prior to incubation with the test fungus, the specimens were exposed to a laboratory weathering cycle. This cycle duplicated the requirements of ASTM D–1413–61 Section 11, with the only modification being the size of the container required to accommodate the tensile specimens. Subsequent to the weathering cycle the weathered specimens were inoculated with a pure culture of *Lenzites trabea* Pers. ex Fries as described in Example 1 and the inoculated specimens were then incubated and broken exactly as set forth in Example 1. The results obtained are set forth in Table II.

TABLE II

| Composition being tested | Retention of Test composition by the wood sample, lbs/ft.$^3$ | Tensile strength (mean of 3 specimens) |
| --- | --- | --- |
| Pentachlorophenol (A) | .02 | 5.40×10$^3$ |
| 2,3,5,6-tetrachloro-4-(methylsulfonyl) pyridine (B) | .02 | 5.14×10$^3$ |
| A/B ratio by weight (96/4) | .0074 | 5.27×10$^3$ |
| A/B ratio by weight (91/9) | .0058 | 5.27×10$^3$ |
|  | .011 | 6.06×10$^3$ |
| A/B ratio by weight (86/14) | .0094 | 5.46×10$^3$ |
| A/B ratio by weight (48/52) | .0055 | 5.10×10$^3$ |
|  | .0070 | 6.12×10$^3$ |
|  | .0090 | 5.44×10$^3$ |

EXAMPLE 3

Mixtures containing weight ratios of sodium pentachlorophenate/2,3,5-trichloro-4-(methylsulfonyl)pyridine of 90/10, 75/25, 50/50, 25/75 were prepared. Each of these mixtures and sodium pentachlorophenate and 2,3,5-trichloro-4-(methylsulfonyl)pyridine were then employed to make a series of aqueous treating compositions wherein either the individual compounds or the mixtures was present at a level of 1.5 percent, 0.5 percent, 0.3 percent, 0.1 percent, 0.05 percent, 0.03 percent and 0.01 percent. All percentages were by weight.

Each aqueous composition thus prepared was employed to treat a specimen of southern yellow pine sapwood. The treatment was accomplished by dipping the specimen in the treating composition for 30 seconds. Immediately following treatment the wood was sprayed with a mycelial suspension of *Ceratocystis ips* (Rumb.) C. Moreau, A.T.C.C. 12860 (a very common sap stain organism on southern yellow pine). Untreated specimens were also inoculated. All inoculated specimens were incubated for 14–18 days at room temperature in petri dishes placed in a desiccator with free water surface, thereby providing essentially 100 percent relative humidity. Following the incubation period the specimens were checked to determine the inhibition of staining by the fungus organism.

The results indicated that sodium pentachlorophenate did not inhibit staining at the highest level employed (1.5 percent). The 2,3,5-trichloro-4-(methylsulfonyl)pyridine prevented staining when employed in an aqueous composition at a concentration between 0.05 and 0.1 percent by weight. These data suggest that 2,3,5-trichloro-4-(methylsulfonyl)pyridine is approximately 30 times as potent as sodium pentachlorophenate. Using this estimated relative potency of the parent compounds, the expected relative potencies of the mixtures were calculated. These relative potencies were then employed to calculate the highest concentration which would be expected to permit fungus growth or staining according to Wadley, The Evidence Requirer to Show Synergistic Action of Insecticides and a Short Cut in Analysis, U.S. Dept. of Agriculture Bulletin ET-223. The calculated relative potencies, expected similar joint effect and the experimentally found values are set forth in Table III.

TABLE III

| Preservative mixtures [1] | Calculated relative potency | Maximum concentration at which staining expected | Minimum inhibiting concentration |
|---|---|---|---|
| 100/0 | 1 | | |
| 90/10 | 3.9 | 0.4 | 0.5-0.1 |
| 75/25 | 8.25 | 0.2 | 0.5-0.1 |
| 50/50 | 15.5 | 0.1 | .01-.03 |
| 25/75 | 22.7 | 0.07 | .01-.03 |
| 0/100 | 30 | | |

[1] Sodium pentachlorophenate/2,3,5-trichloro-4-(methylsulfonyl)pyridine.

I claim:

1. A synergistic fungicidal composition which comprises an intimate mixture of (A) a member of the group consisting of pentachlorophenol and sodium pentachlorophenate, and (B) a member selected from the group consisting of 2,3,5-trichloro-4-(methylsulfonyl)pyridine and 2,3,5,6-tetrachloro-4-(methylsulfonyl)pyridine, wherein said mixture contains from 96 to 25 parts by weight of (A) and from 4 to 75 parts by weight of (B).

2. A fungicidal synergistic composition wherein the mixture claimed in claim 1 is in intimate mixture with a carrier.

3. The fungicidal synergistic composition claimed in claim 1 wherein 2,3,5-trichloro-4-(methylsulfonyl) pyridine and sodium pentachlorophenate are intimately admixed in the proportions of from 10 to 75 parts by weight and from 90 to 25 parts by weight, respectively.

References Cited

UNITED STATES PATENTS

| 3,296,272 | 1/1967 | Johnston | 424—358 |
| 3,371,011 | 2/1968 | Johnston | 167—33 |

OTHER REFERENCES

Chemical Abstracts, vol. 62, 1965.

STANLEY J. FRIEDMAN, Primary Examiner

U.S. Cl. X.R.

424—347